United States Patent
Goodman et al.

(10) Patent No.: US 12,438,770 B2
(45) Date of Patent: Oct. 7, 2025

(54) SYSTEM AND METHOD FOR CUSTOMIZATION OF ONBOARDING PROCESS

(71) Applicant: Dell Products L.P., Round Rock, TX (US)

(72) Inventors: Bradley K. Goodman, Nashua, NH (US); Kirk Alan Hutchinson, Londonerry, NH (US)

(73) Assignee: Dell Products L.P., Round Rock, TX (US)

( * ) Notice: Subject to any disclaimer, the term of this patent is extended or adjusted under 35 U.S.C. 154(b) by 63 days.

(21) Appl. No.: 18/301,652

(22) Filed: Apr. 17, 2023

(65) Prior Publication Data
US 2024/0348496 A1    Oct. 17, 2024

(51) Int. Cl.
*H04L 41/0806*    (2022.01)
*H04L 41/0253*    (2022.01)

(52) U.S. Cl.
CPC ...... *H04L 41/0806* (2013.01); *H04L 41/0253* (2013.01)

(58) Field of Classification Search
None
See application file for complete search history.

(56) References Cited

U.S. PATENT DOCUMENTS

| | | | |
|---|---|---|---|
| 2012/0177052 A1* | 7/2012 | Chen | H04W 40/36 370/392 |
| 2018/0196960 A1* | 7/2018 | Gullicksen | H04L 63/107 |
| 2019/0373083 A1* | 12/2019 | Nucci | H04L 63/062 |
| 2020/0275273 A1* | 8/2020 | Smith | H04W 12/50 |
| 2021/0152470 A1* | 5/2021 | Filsfils | H04L 45/74 |
| 2022/0132298 A1* | 4/2022 | Shiner | H04W 12/04 |
| 2022/0353680 A1* | 11/2022 | Hu | H04W 12/069 |
| 2022/0407700 A1* | 12/2022 | Panchapakesan | H04L 47/828 |
| 2023/0209321 A1* | 6/2023 | Suryadi | H04W 4/029 455/404.2 |
| 2023/0229778 A1* | 7/2023 | Terpstra | G06F 21/572 713/2 |

* cited by examiner

*Primary Examiner* — Mohamed Ibrahim
(74) *Attorney, Agent, or Firm* — WOMBLE BOND DICKINSON (US) LLP

(57) ABSTRACT

Methods and systems for managing onboarding of endpoint devices are disclosed. Customized onboarding processes may be performed depending on roles for different endpoint devices. During onboarding, the endpoint devices may operate in secure modes of operation which may limit customization of onboarding. To facilitate customization of onboarding, the endpoint device may include tags. The tags may convey information usable to operably connected to intermediary devices that may allow for operable connections to control planes that manage the onboarding processes to be established. The control planes may not be limited by the secure modes of operation and allow for greater customization of onboarding.

20 Claims, 10 Drawing Sheets

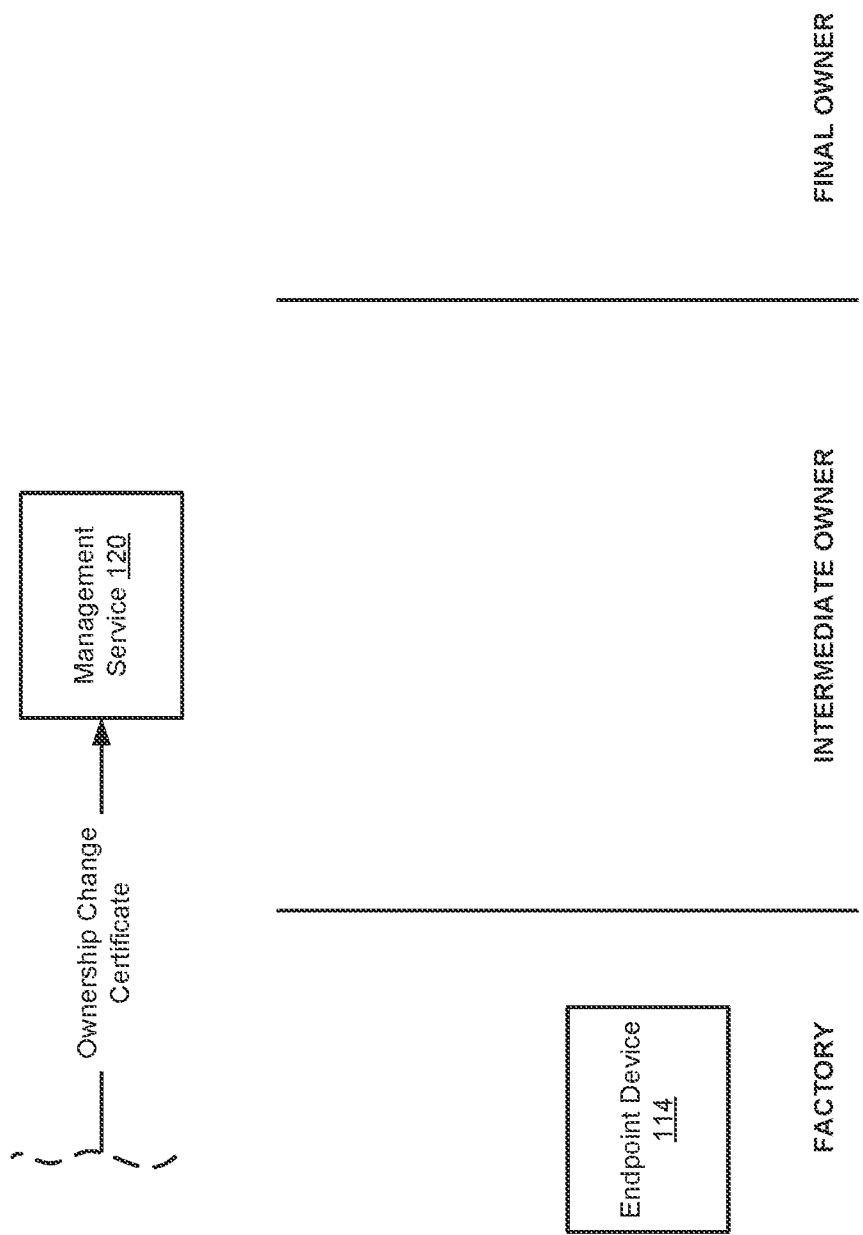

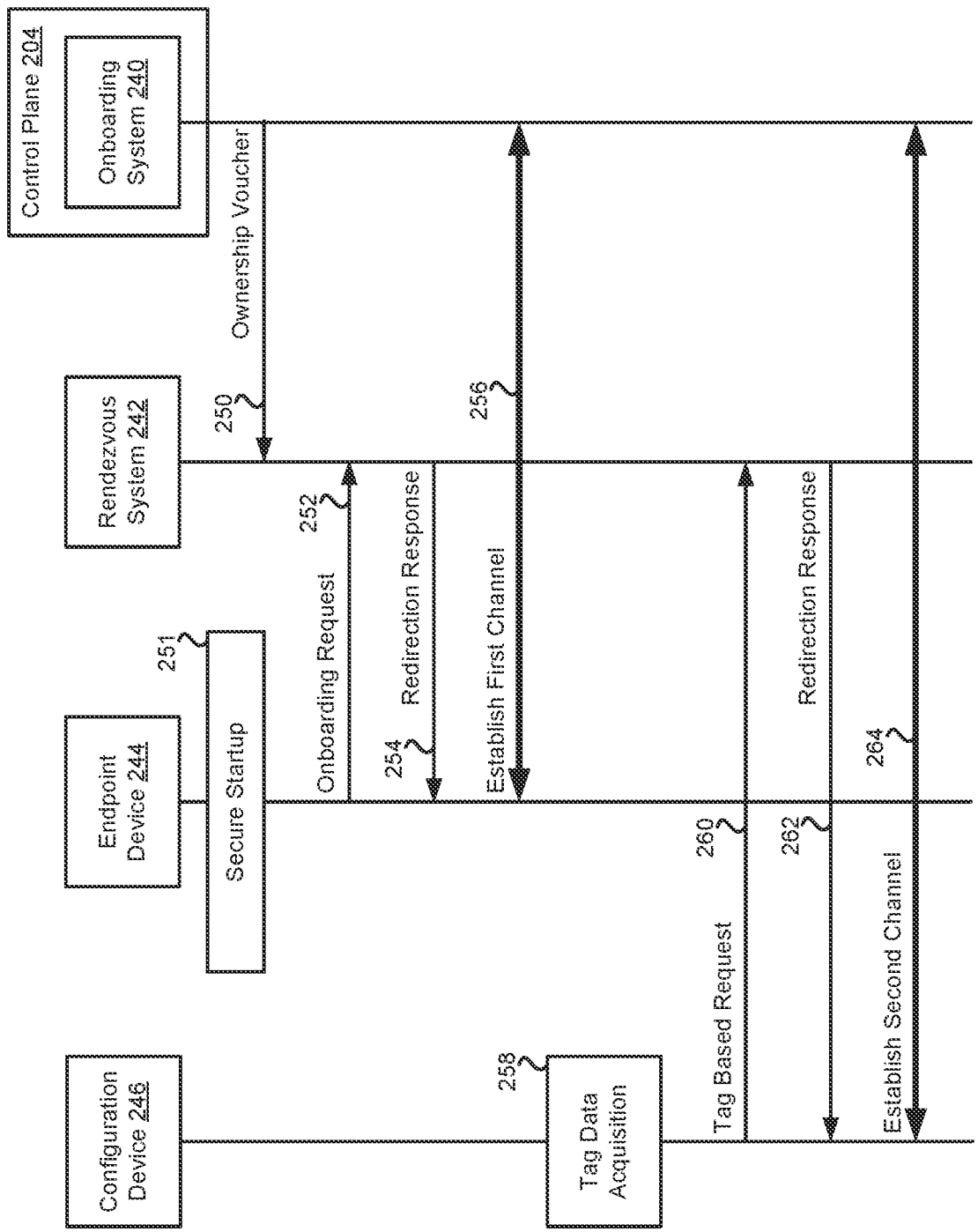

SYSTEM AND METHOD FOR CUSTOMIZATION OF ONBOARDING PROCESS

FIELD

Embodiments disclosed herein relate generally to onboarding process management. More particularly, embodiments disclosed herein relate to systems and methods to customize onboarding processes.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components and the components of other devices may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 2A-2C show data flow diagrams in accordance with an embodiment.

FIGS. 2D-2E show interaction diagrams in accordance with an embodiment.

DETAILED DESCRIPTION

Figure 1:
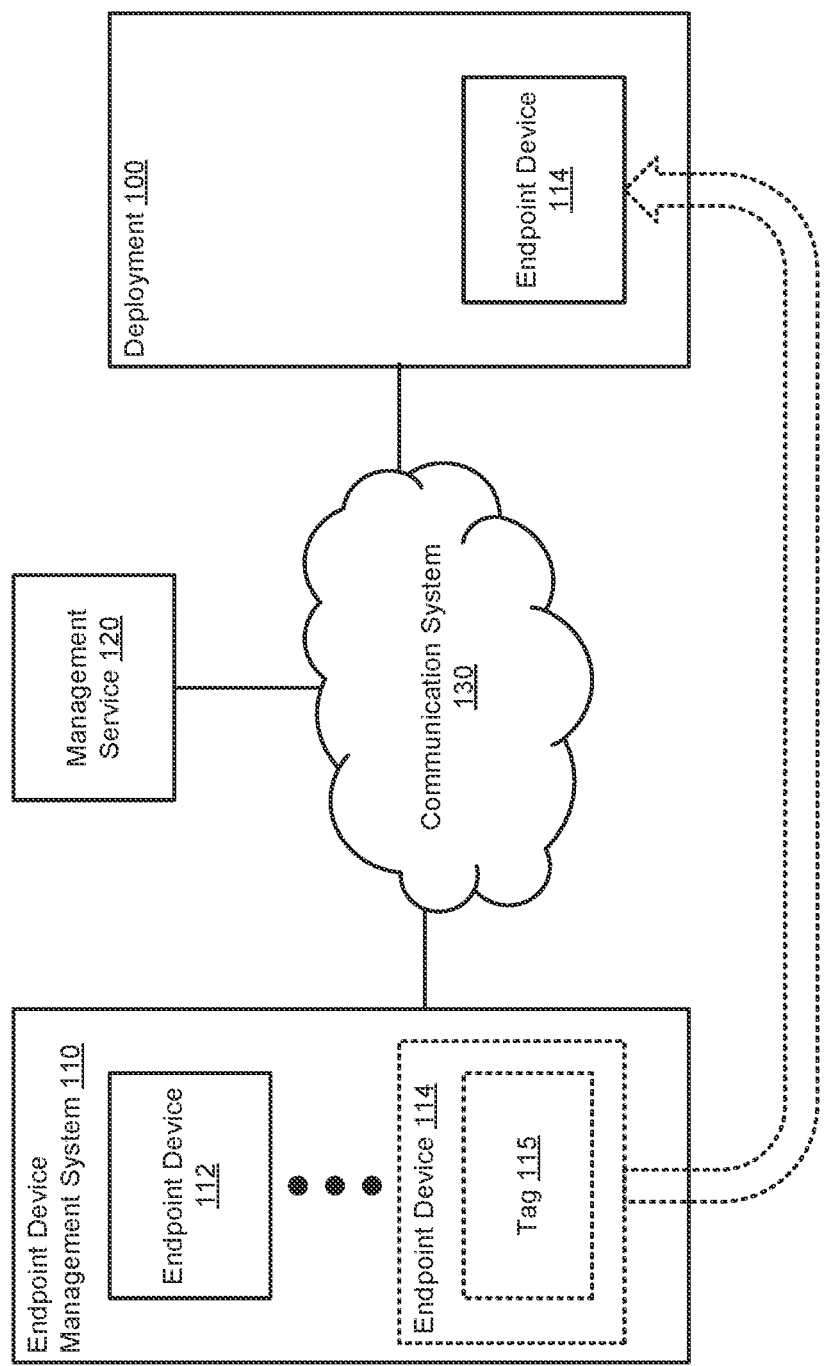
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for providing computer implemented services using endpoint devices. To provide the computer implemented services, endpoint devices may join deployments through onboarding processes. During onboarding, an endpoint device may be modified to facilitate cooperative operation with other endpoints of the deployment.

However, depending on the role of the endpoint device, customized onboarding processes for endpoint devices may need to be performed. The customized onboarding may place the endpoint devices in corresponding operating states to perform the roles.

To facilitate customization of onboarding, the endpoint devices may include tags. The tags may be used to convey information regarding (i) the endpoint device, and (ii) a rendezvous system. The information from the tags may be used to place a configuration device into communication with a control plane tasked with managing the onboarding process. Through the communication, a user of the configuration device may customize onboarding the endpoint device managed by the control plane.

The tag may be a physical structure, and the information may be obtained from the tag by obtaining an interpreting an image of the tag (e.g., reading an interpreting a barcode that encodes information). Accordingly, an administrator or other person near the endpoint device may read the tag to automatically connect to the control plane thereby facilitating customization of the onboarding process.

To place the configuration device in communication with the control plane, the rendezvous system may be configured by the control plane. To do so, the control plane may provide the rendezvous system with proof of rights in the endpoint device (e.g., an ownership voucher), and redirection information for the control plane or a designated agent of the control plane. When the configuration devices reads the tag, the configuration device may be directed to the rendezvous device which, in turn, may redirect the configuration device to the control plane or designated agent.

The endpoint device may, during onboarding, enter a secured operating mode that may limit functionality of the endpoint device. Consequently, an administrator or other person may not be able to customize the onboarding process via the endpoint device. When in the secured operating mode, the endpoint device may also contact the rendezvous system which may redirect the endpoint device to the control plane.

By doing so, at a time of manufacture, a control plane and/or designated agent need not be known. Rather, the tag may provide and the endpoint device may use information to reach the rendezvous system. Once ownership of the endpoint device passes to an operator of the control plane, the operator may reconfigure the rendezvous system using cryptographically verifiable data structures (e.g., ownership vouchers) to redirect the configuration device and endpoint device to the control plane and/or designated agents.

Thus, embodiments disclosed herein may address, among others, the technical problem of security of endpoint devices as the devices pass through and are onboarded. To manage security, the endpoint devices may be configured to automatically enter secured modes of operation which may limit the ability of onboarding processes to be customized via the endpoint devices. To provide onboarding customization while managing security, a system in accordance with an embodiment may provide alternative processes for customizing onboarding processes by facilitating communications with control planes that manage onboarding of endpoint devices.

In an embodiment, a method for managing onboarding of a data processing system is provided. The method may include obtaining tag information using a tag of the data processing system, the tag information comprising a link and a globally unique identifier for the data processing system; sending a message to a rendezvous system using the link, the message comprising the globally unique identifier from the tag; using, based on redirection by the rendezvous system to a control plane, an interface accessed via the control plane to complete the onboarding of the data processing system; and completing the onboarding of the data processing system using the interface.

Obtaining the tag information may include obtaining an image depicting the tag; and decoding the image of the tag to obtain the link and the globally unique identifier.

The tag information may be obtained while the data processing system is operating in a secure mode that prevents at one onboarding operation from being initiated using the data processing system, the onboarding operation being able to be initiated using the interface.

The redirection to the rendezvous system may be responsive to the message and tied to the globally unique identifier.

The method may also include prior to obtaining the tag information and initiation of the onboarding: obtaining an ownership voucher for the data processing system; configuring the rendezvous system using the ownership voucher and redirection information for the control plane; during the onboarding: establishing a first connection with the data processing system; establishing a second connection with a configuration device; presenting the interface to the configuration device using the second connection; obtaining instructions via the interface; and participating in the completion of the onboarding of the data processing system based on the instructions.

Participating in the completion may include modifying operation of the data processing system based on the instructions.

The configuration device may be a personal computing device used to obtain the image.

In an embodiment, a non-transitory media is provided. The non-transitory media may include instructions that when executed by a processor cause the computer-implemented method to be performed.

In an embodiment, a data processing system is provided. The data processing system may include the non-transitory media and a processor, and may perform the method when the computer instructions are executed by the processor.

Turning to FIG. 1, a block diagram illustrating a system in accordance with an embodiment is shown. The system shown in FIG. 1 may provide computer-implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include deployment 100. Deployment 100 may be operated by an entity (e.g., a business) and include any number of endpoint devices.

Each of the endpoint devices may have a limited capacity for providing computer implemented services. Additionally, overtime the quantity and/or type of computer implemented services desired by the entity may change. Consequently, the capacity of deployment 100 to provide computer implemented services may become insufficient.

To change the capacity and/or capabilities of deployment 100, additional data processing systems may be added to deployment 100. For example, the entity may contract with a seller of endpoint devices to have endpoint devices (e.g., 114) added to deployment 100.

To add an endpoint device to deployment 100, an onboarding process may be performed. During the onboarding process, the endpoint devices may be configured to operate in accordance with expectations of endpoint devices of deployment 100. The onboarding process may include, for example, (i) deploying software to the endpoint device, (ii) configuring various settings of the endpoint device for operation, and/or other changes to the endpoint device may be made to prepare the endpoint device for cooperative operation with other devices of deployment 100.

Depending on how each endpoint device is to function, customized onboarding processes may be performed. The customized onboarding processes may be performed by invoking certain functionalities of the endpoint devices during onboarding.

However, prior to and/or during the onboarding process, any of the endpoint devices may operating in a predetermined manner that may improve resiliency to various type of attacks. For example, the endpoint devices may be limited in their functionalities that may be invoked locally. Consequently, an administrator or other person with an endpoint devices may not be able to invoke functions of the endpoint device using the endpoint device itself to customize the onboarding process.

In general, embodiments disclosed herein may provide methods, systems, and/or devices for managing endpoint devices. To manage the end point devices, tags (e.g., 115) may be affixed to the endpoint device. A tag may be a physical structure (e.g., barcode, other type of code) interpretable via imaging. When interpreted, the tag may convey information usable to participate in the onboarding process.

For example, the tag may convey information regarding a rendezvous system used to manage onboarding processes. The tag may also convey a globally unique identifier (GUID) for the endpoint device. These pieces of information may be used (directly or indirectly) to communicate with a management entity tasked with managing onboarding process for the endpoint device.

By communicating with the management entity, the onboarding process for end endpoint may be customized by invoking certain function of the endpoint device that may not otherwise be invoked during using the endpoint device (e.g., during onboarding). Consequently, an administrator that is with the endpoint device may customize onboarding of the endpoint device.

Once customized, the tag may be used to facilitate management of the endpoint device through subsequent communications with the management entity and/or other entities.

To provide the above noted functionality, the system of FIG. 1 may include deployment 100, endpoint device management system 110, and management service 120. Each of these components is discussed below.

Deployment 100, as noted above, may provide computer implemented services using any number of endpoint devices. To do so, deployment 100 may (i) onboard endpoint devices, (ii) use the onboarded endpoint devices to provide the computer implemented services, and (iii) facilitate customization of the onboarding processes through presentations of interfaces for respective endpoint devices through which administrators may provide user feedback to select how the onboarding and/or other management processes may be implemented.

Figure 2B:
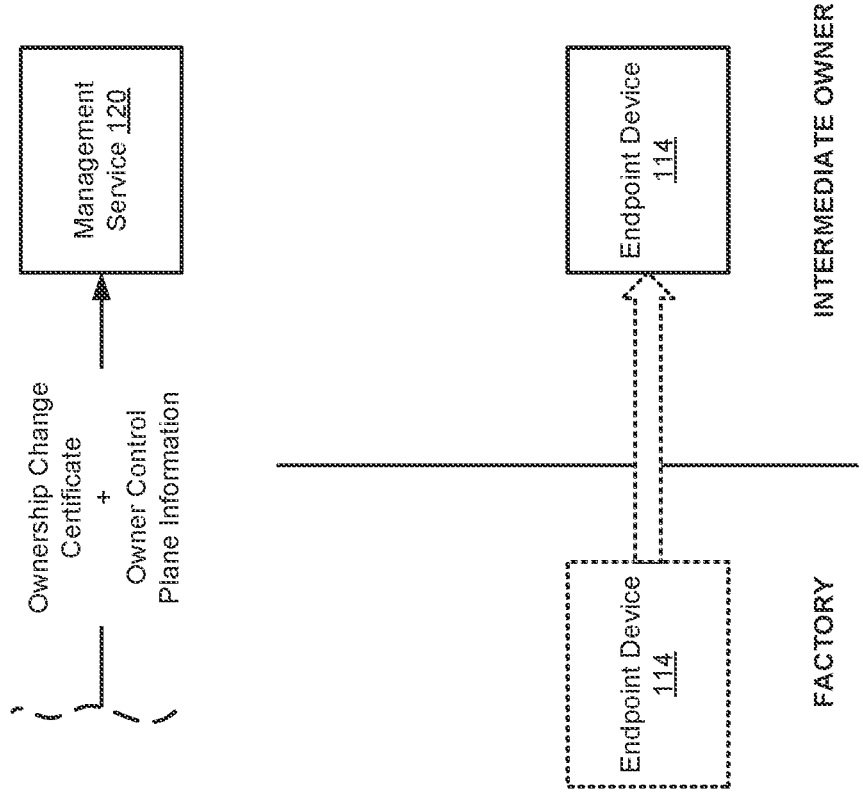
Figure 2C:
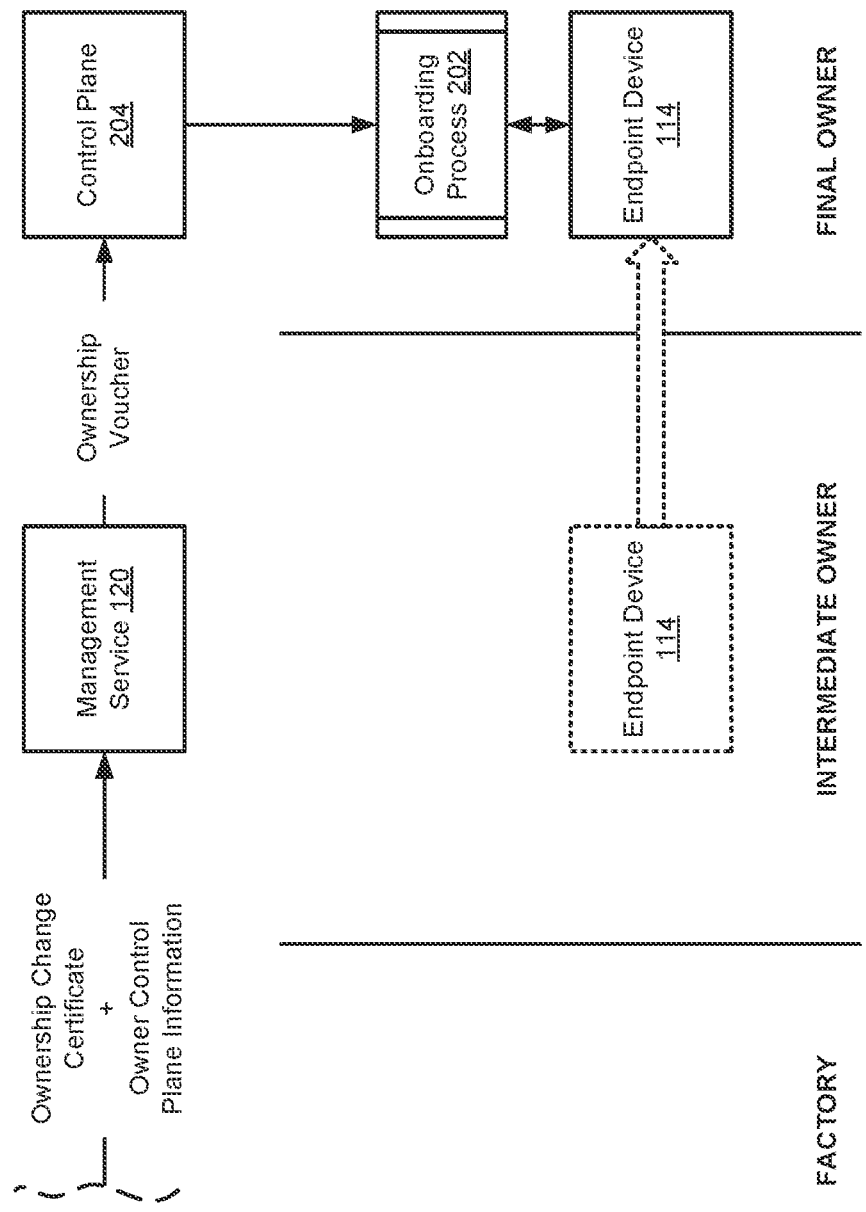
Figure 2E:
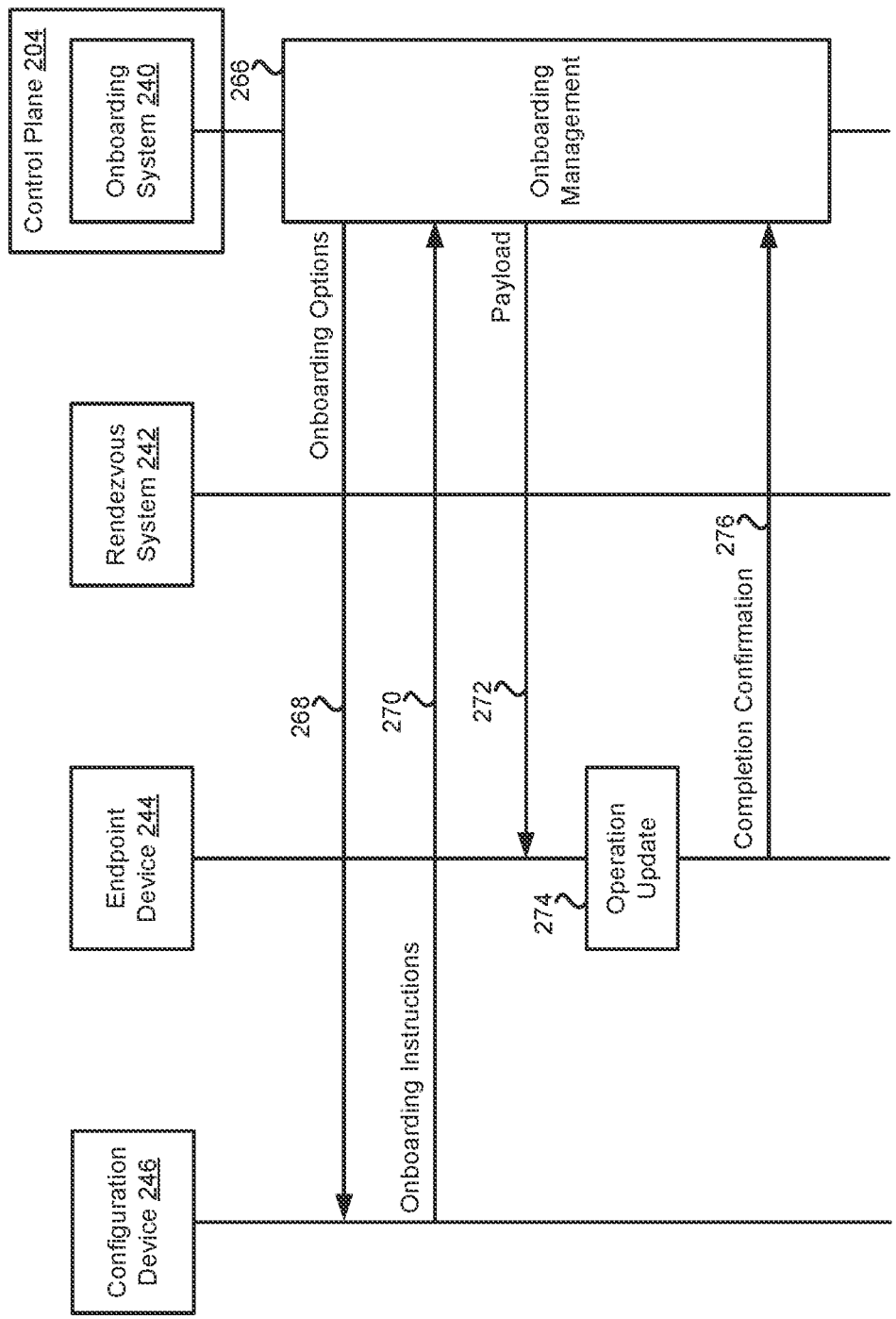

During onboarding of endpoint devices, an onboarding service of deployment 100 may (i) customize the behavior or rendezvous systems to establish connections to both endpoint devices and configuration devices, and (ii) present interfaces to the configuration devices through which administrators or other persons may customize management processes for the endpoint devices. The behavior of the rendezvous system may be customized using ownership vouchers and redirection information to the interfaces. The ownership vouchers may include respective GUIDs which may be conveyed to the configuration devices by tags of the endpoint devices. Consequently, when a configuration device connects to a rendezvous system and provides the GUID, the rendezvous system may identify and provide the corresponding redirection information to an interface usable to customize management for the endpoint device identified by the GUID. Refer to FIGS. 2D-2E for additional details regarding customization of onboarding.

An ownership voucher may be a cryptographically verifiable data structure usable to establish ownership in and control over an endpoint device. When manufactured, an endpoint device may be provided with a root of trust. The ownership voucher may include certificates that establish a chain of ownership verifiable back to the root of trust. For example, when manufactured, a public key may be set as the root of trust for the endpoint device. A certificate, signed by the private key corresponding to the public key, may establish initial ownership in the endpoint device. For example, the certificate may include a public key of the owner of the endpoint device, a GUID for the endpoint device, and a description of the endpoint device. The included public key may establish the entity associated with the public key as the owner of the endpoint device. Any number of additional certificates establishing transfers in ownership (e.g., signed using the private key of the public key included in the last owner transfer certificate in the chain) may form a cryptographically verifiable chain of ownership over the endpoint device. Other certificates may delegate authority over the endpoint device (e.g., using certificates signed with private keys of the owner at the time of formation, and include authority delegation statements such as rights in invoking certain functions of the endpoint devices).

When ownership is transferred to a final owner (e.g., an operator of deployment 100), the owner may use the ownership voucher to establish rights in managing the operation of the rendezvous system. Consequently, an onboarding service operated by the final owner may use the ownership voucher to direct the rendezvous system to redirect the endpoint device and/or other entities (e.g., configuration devices) to resources managed by the final owner and usable to manage onboarding of the endpoint device. Refer to FIGS. 2A-2C for additional details regarding ownership vouchers.

Endpoint device management system 110 may facilitate (i) acquisition of new endpoint devices (112-114) for use in deployment 100, and (ii) generation of some of the cryptographically verifiable data structures.

To facilitate acquisition of new endpoint devices, endpoint device management system 110 may implement a portal or other interface through which agents of various entities may enter contractual relationships for adding endpoint devices to various deployments. When used by the agents, information regarding the future owner of one of endpoint devices 112-114 may be obtained. Once obtained, an endpoint device (e.g., 112, 114) may be selected or an endpoint device (not shown) that has already been transferred to another entity (e.g., a reseller) may be selected.

For endpoint devices that have not already been transferred to ownership by another entity, the selected endpoint device may be configured for deployment by (i) establishing a root of trust (e.g., a public key) for the endpoint device and/or GUID, (ii) configuring the endpoint device to enter a secure mode of operation prior to and during onboarding, and/or (iii) configuring the endpoint device to automatically connect with a rendezvous system during onboarding. A tag each endpoint may also, as noted above, convey information usable to reach the rendezvous system and the GUID for the endpoint device. The GUID for the endpoint device, as noted above, may be included in the ownership voucher.

For endpoint devices that have already been transferred to ownership by another entity, only the change in ownership may be documented using a cryptographically verifiable data structure (e.g., a signed certificate document the change in ownership from one entity to another entity). Establishment of roots of trust, rendezvous systems to connect with, and other configurations may have already been completed (e.g., prior to transfer of ownership of the endpoint device to intermediate owners). Refer to FIGS. 2A-2C for additional details regarding establishing cryptographically verifiable data structures to establish ownership.

Management service 120 may (i) cryptographically document changes in ownership over endpoint devices, and (ii) facilitate onboarding services of deployment 100 and/or other entities with cryptographically verifiable data structures indicating the changes in ownership and/or other information for endpoint devices. To do so, management service 120 may obtain information regarding changes in ownership of the endpoint devices (which may be in the form of certificates or other cryptographically verifiable data), obtain consolidated cryptographically verifiable data structures (e.g., ownership vouchers) based on other cryptographically verifiable data structures (e.g., change in ownership certificates), and distribute cryptographically verifiable data structures of any type to other entities.

Figure 3A:
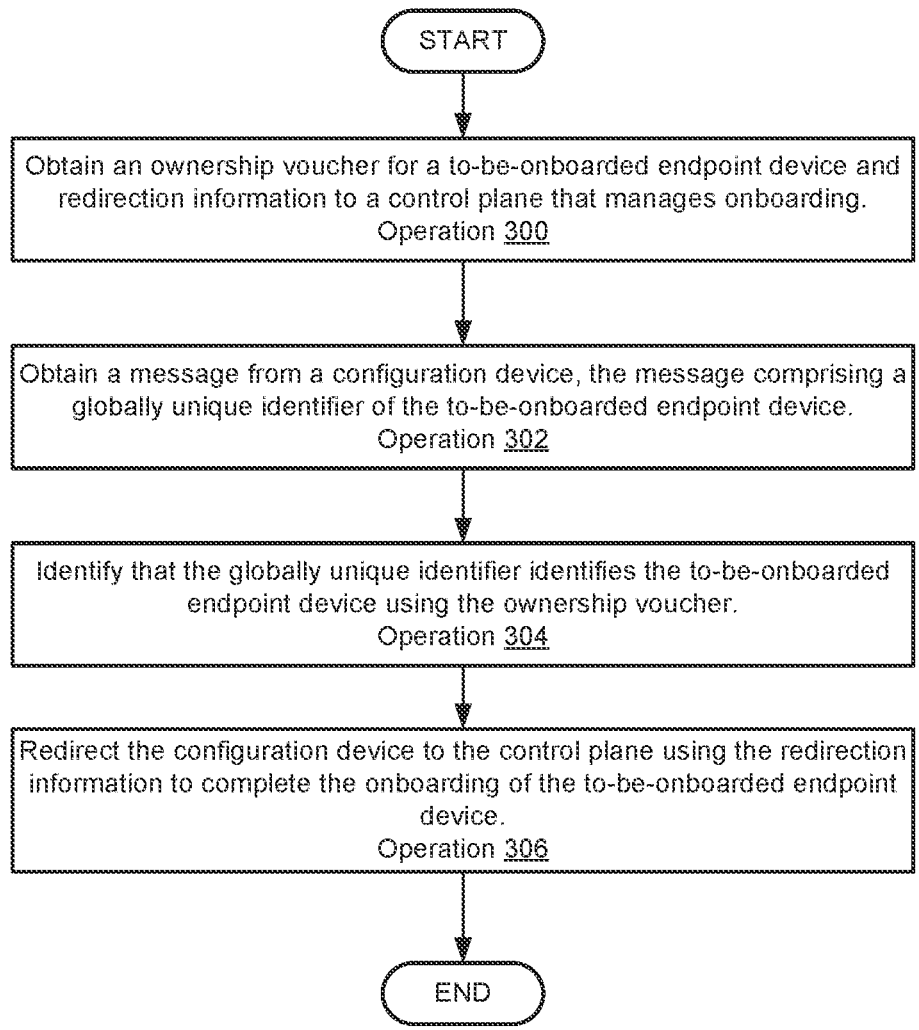
FIGS. 3A-3C show flow diagrams illustrating methods in accordance with an embodiment.
Figure 3B:
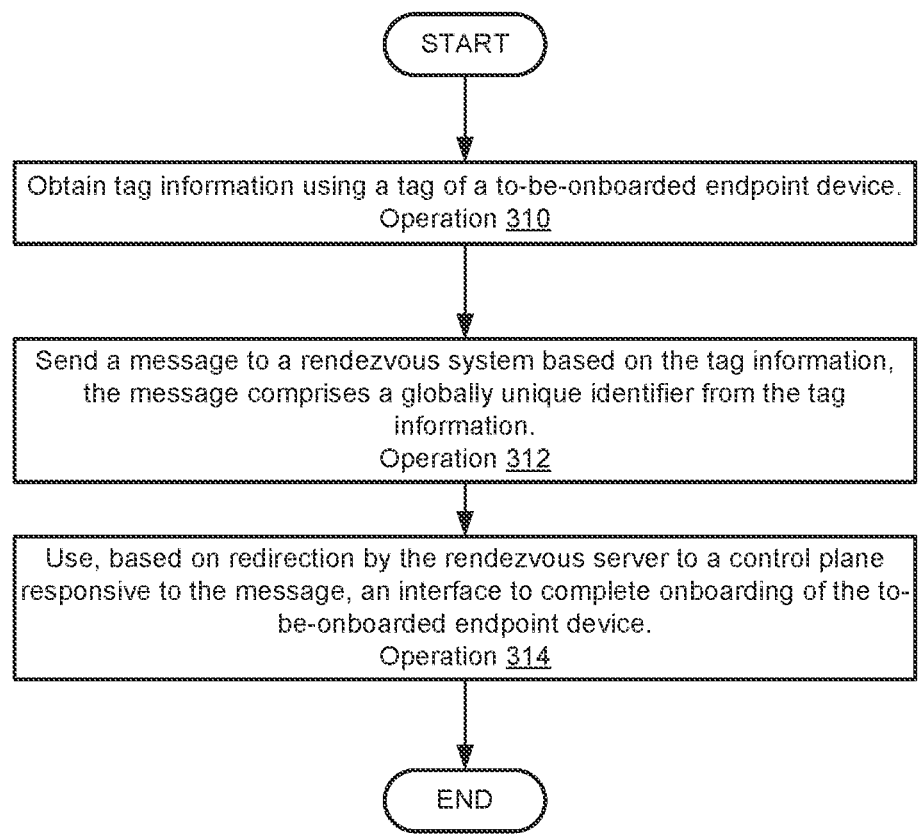
Figure 3C:
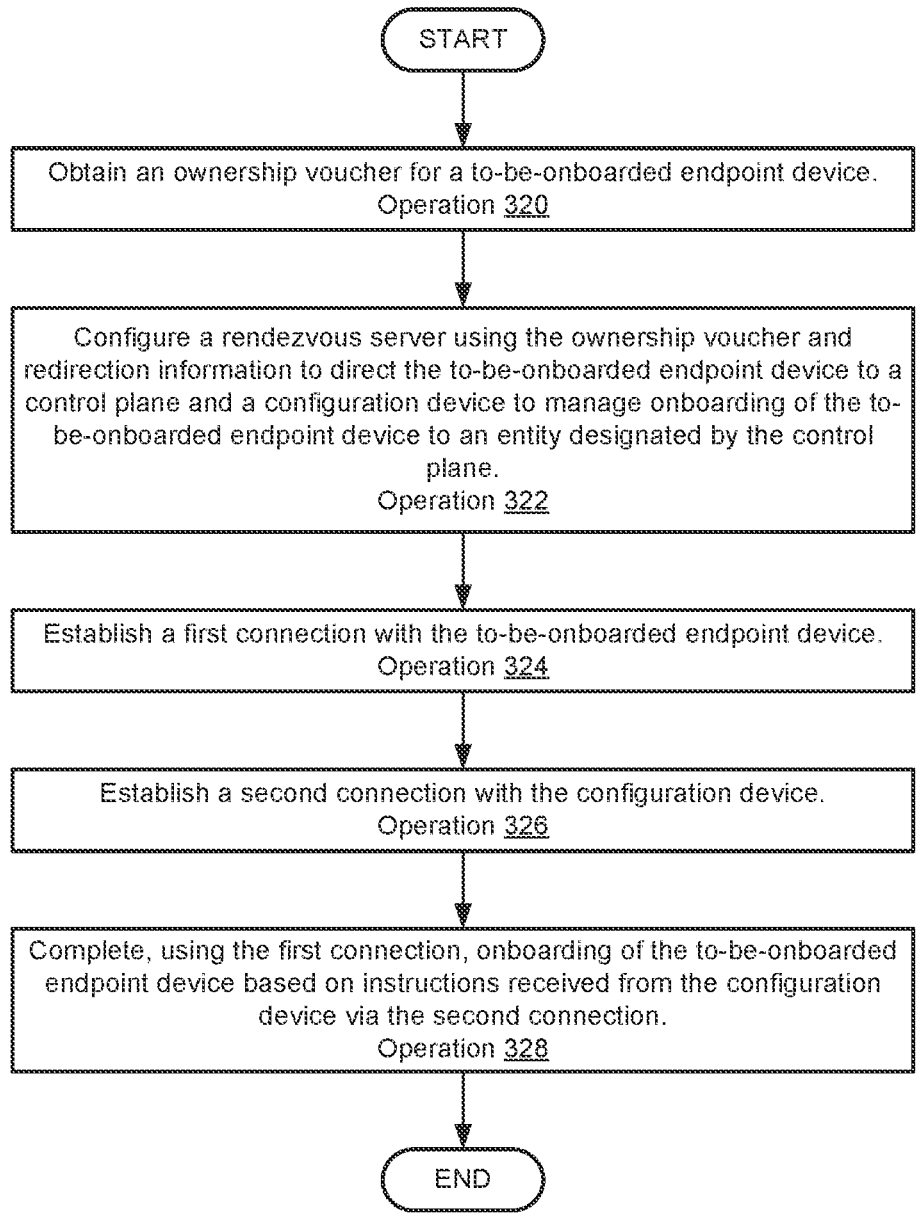

When providing their functionality, any of (and/or components thereof) deployment 100, endpoint device management system 110, and/or management service 120 perform all, or a portion, of the methods illustrated in FIGS. 3A-3C.

Any of (and/or components thereof) deployment 100, endpoint device management system 110, and/or management service 120 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

Any of the components illustrated in FIG. 1 may be operably connected to each other (and/or components not illustrated) with communication system 130. In an embodiment, communication system 130 includes one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

As discussed above, ownership of endpoint devices may change over time. FIGS. 2A-2C show diagrams of example data flows that may occur over time as ownership of endpoint device 104 changes in accordance with an embodiment.

Turning to FIG. 2A, a first data flow diagram in accordance with an embodiment is shown. In FIG. 2A, the page is divided into different regions corresponding to periods of time when endpoint device 114 is owned and/or located at a factory, with an intermediate owner, and with a final owner (e.g., an operator of deployment 100). The factory may house endpoint device management system 110 and/or other components shown in FIG. 1. Similar diagrams are shown in FIGS. 2B-2C, but illustrate different periods of time.

When endpoint device 114 is positioned at the factory, an initial root of trust may be established by embedding a public key in endpoint device 114. Consequently, endpoint device 114 may use the public key to establish whether statements regarding authority, changes in ownership, changes in hardware, etc. are valid.

While at the factory, an ownership change certificate may be generated and used to establish the factory as the initial owner of endpoint device 114. The ownership change certificate may be provided to management service 120 which may use it to update the ownership voucher.

For example, the certificate may include a globally unique identifier (GUID), a description of endpoint device 114, and a copy of the public key of the root of trust. The change in ownership certificate may be signed using the private key corresponding to the public key for the root of trust.

Turning to FIG. 2B, a second data flow diagram in accordance with an embodiment is shown. In FIG. 2B, boxes representing endpoint device 114 are shown. The first to the left is drawn in dashing to indicate that endpoint device 114 has been moved from the factory to another location where and intermediate owner has taken possession of endpoint device 114. The oversized arrow drawn with dashed outline is included to indicate the same change in location.

Continuing with the example from FIG. 2A, now consider an example scenario where the intermediate owner contracts with the factory to take ownership of endpoint device 114. To do so, the factory may generate an ownership change certificate that includes the GUID, description of endpoint device 114, and a public key of the intermediate owner. The ownership change certificate may be signed with the private key corresponding to the public key of the root of trust (e.g., the factory in this example).

Additionally, information regarding a control plane operated by the intermediate owner may also be provided to management service 120 (e.g., as part of the transaction). Consequently, management service 120 may be aware of the control plane authorized to manage endpoint device 114.

The process depicted in FIG. 2B may be repeated for any number of intermediate owners. Consequently, the resulting ownership voucher may include information based on any number of changes in ownership.

Turning to FIG. 2C, a third data flow diagram in accordance with an embodiment is shown. In FIG. 2C, boxes representing endpoint device 114 are shown. The first box to the left in FIG. 2C is drawn in dashing to indicate that endpoint device 114 has been moved from the intermediate owner to another location where a final owner has taken possession of endpoint device 114. The oversized arrow drawn with dashed outline is included to indicate the same change in location.

Continuing with the example from FIG. 2B, now consider an example scenario where the final owner contracts with the intermediate owner to take ownership of endpoint device 114. To do so, the intermediate owner may generate an ownership change certificate that includes the GUID, description of endpoint device 114, and a public key of the final owner. The ownership change certificate may be signed with the private key corresponding to the public key of the intermediate owner.

Similarly, information regarding the owner's control plane may also be conveyed to management service 120. Consequently, management service 120 may convey the resulting ownership voucher to control plane 204 (e.g., a control plane designated by final owner, such as a control plane used to management deployment 100 and/or onboarding for deployment 100).

After taking possession of endpoint device 114, the final owner may wish to onboard endpoint device 114 through onboarding process 202. During onboarding process 202, control plane 204 may reconfigure a rendezvous system using the ownership voucher thereby establishing connections to endpoint device 114 and/or devices used by administrators or other persons to manage configuration of endpoint device 114. Refer to FIGS. 2D-2C for additional details regarding onboarding process 202.

Turning to FIGS. 2D-2E, interactions diagrams illustrating processes performed by and interactions between components of a system in accordance with an embodiment are shown. In the diagrams, components of the system are illustrated using named rectangular boxes at the top of each figure. Lines descend from each of these boxes. Boxes superimposed over these lines may indicate processes performed by the corresponding component, and arrows between the descending lines indicate interactions between the components.

Generally, the processes and interactions are temporally ordered in an example order with time increasing from the top to the bottom of the page. For example, the interaction labeled as 250 may occur prior to the interaction labeled as 252. However, it will be appreciated that the processes and interactions may be performed in different orders, any may be omitted, and other processes or interactions may be performed without departing from embodiments disclosed herein.

Turning to FIG. 2D, a first interaction diagram in accordance with an embodiment is shown. FIG. 2D may illustrate a start of an onboarding process after endpoint device 244 has been positioned at a final owner location and an ownership voucher has been obtained by onboarding system 240.

Onboarding system 240 may be implemented using a data processing system, and may be part of control plane 204 operated by the final owner. To facilitate customization of onboarding processes, onboarding system 240 may operate and present various interfaces (e.g., graphical user interfaces) through which onboarding processes may be customized. When an ownership voucher is obtained, a corresponding interface may be established. The interface may be associated with a network endpoint such that configuration device 246 may interact with it.

Similarly, onboarding system may perform onboarding processes. To do so, endpoint device 244 may be directed to onboarding system 240 (e.g., another network endpoint) which may establish itself as having authority over endpoint device 244 through the ownership voucher (e.g., thereby allowing onboarding system 240 to invoke functions of endpoint device 244 to complete the customized onboarding).

After the ownership voucher is obtained, at interaction 250, a copy of the ownership voucher may be provided to rendezvous system 242. Additionally, information regarding where to redirect (i) endpoint device 244, and (ii) configuration device 246 may be provided. The information may include the network endpoints, information usable to resolve the network endpoint (e.g., a domain name system server (DNS)), and/or other information usable to establish connections between endpoint device 244/configuration device 246 and onboarding system 240/interfaces, respectively. While described as being separate from the ownership voucher, it will be appreciated that the information to redirect endpoint device 244/configuration device 246 may be part of the ownership voucher or another cryptographically verifiable data structure.

At process 251, endpoint device 244 may perform a secure startup. The secure startup may limit the functionality of endpoint device 244 (e.g., to reduce risk during onboarding) and initiate performance of interaction 252.

At interaction 252, a message may be sent to rendezvous system 242. The message may include an onboarding request for information. For example, onboarding request may include the GUID of endpoint device 244. Consequently, rendezvous system 242 may identify the ownership voucher (e.g., by matching the GUID to a copy included in the ownership voucher).

Responsive to the identification, at operation 254, a redirection response may be provided to endpoint device 244. The redirection response may include information usable by endpoint device 244 to contact onboarding system 240. Thus, endpoint device 244 may be in condition to be configured by onboarding system 240 for onboarding purposes.

However, a customized onboarding process may need to be performed. To facilitate customization, onboarding system 240, as noted above, have prepared an interface through which an administrator may customize the onboarding (and/or other type of management) process.

To access the interface, an administrator or other person may use configuration device 246. Configuration device may be implemented using a personal electronic device such as a smartphone, tablet computer, or other type of data processing system. Configuration device 246 may include or be operably connected to a camera through which images of endpoint device 244 may be acquired.

At process 258, configuration device 246 may perform tag data acquisition. During tag data acquisition process, an image of a tag of endpoint device 244 may be obtained (e.g., capture, received from another device, read from storage) and interpreted. The interpretation may yield (i) information to communicate with rendezvous system 242, and (ii) the GUID for endpoint device 244. The information to communicate may include an address and/or information to resolve an address (e.g., a specific DNS server, which may be local or remote). Consequently, the information may have limited use depending on whether the DNS server is accessible (e.g., if configuration device 246 can connect to the DNS server or is walled off such as not being on a same network segment). Accordingly, use of the information may be limited by which networks configuration device 246 may communicate with or through.

Once obtained, at interaction 260, a request may be sent to rendezvous system 242 using the information to communicate from the interpretation of the tag. The request may include the GUID. Consequently, rendezvous system 242 may identify that corresponding redirection information associated with the ownership voucher for endpoint device 244 (e.g., based on the matching GUID included therein).

At interaction 262, rendezvous system 242 may send a redirection response to configuration device 246. The redirection response may, as noted above, include information through which configuration device 246 may establish a connection with an interface. For example, the information may include information to reach a network endpoint associated with the interface.

At interaction 264, a second channel between configuration device 246 and the interface may be established. Thus, once established, configuration device 246 may provide information to onboarding system 240 via the interface reachable via the second channel, and onboarding system 240 may manage an onboarding process via the first channel.

Turning to FIG. 2E, a continuation of the interaction diagram shown in FIG. 2E in accordance with an embodiment is shown.

After the channels are established, at process 266, onboarding management may be performed by onboarding system 240. During onboarding management, onboarding operations may be presented to the user of configuration device 246 via the interface. The onboarding operation, at interaction 268, may be presented by sending information regarding the operations to configuration device 246. The user of configuration device 246 may provide user feedback indicating selection of any of the options. Any number and types of operations may be selected. Thus, the user may establish a customized process for onboarding endpoint device 244.

Once obtained, at interaction 270, onboarding instructions based on the customized onboarding process may be provided to onboarding system (e.g., via messages directed to the interface).

Interactions 268 and 270 may be performed using the second channel.

Once obtained, at interaction 272, onboarding system 240 may generate and send a payload to endpoint device 244. The payload may specify one or more actions to be performed by endpoint device 244 to perform the customized onboarding process.

At process 274, endpoint device 244 may perform update process 274. Update process may be based at least in part on the payload, and may modify operation of endpoint device 244 to place endpoint device 244 into compliance with standards established by the first owner (e.g., and enforced during onboarding).

At interaction 276, a completion confirmation may be provided by endpoint device 244 to notify onboarding system 240 that the onboarding process (or at least a portion based on the payload) is complete.

Interactions 262 and 276 may be performed using the first channel.

Thus, as seen in FIGS. 2D-2E, an endpoint device may be onboarded using a customized onboarding process that may not be implemented through the endpoint device. To facilitate customization, a tag of the endpoint device may include information usable to direct various devices indirectly to interfaces usable to customize the onboarding process. The devices may be indirectly directed to the interface through similar rendezvous systems used for onboarding purposes As discussed above, the components of FIG. 1 may perform various methods to facilitate customized onboarding of endpoint devices. FIGS. 3A-3C illustrates methods that may be performed by the components of the system of FIG. 1. In the diagrams discussed below and shown in FIGS. 3A-3C, any of the operations may be repeated, performed in different orders, and/or performed in parallel with or in a partially overlapping in time manner with other operations.

Turning to FIG. 3A, a flow diagram illustrating a method for performing a customized onboarding of an endpoint device in accordance with an embodiment is shown. The method may be performed by any of deployment 100, endpoint device management system 110, management service 120, and/or other components of the system shown in FIG. 1.

At operation 300, an ownership voucher for an endpoint device that is to be onboarded is obtained. Redirection information to a control plane that manages the onboarding may also be obtained. The ownership voucher and redirection information may be obtained from the control plane.

The ownership voucher may include a copy of a GUID for the endpoint device, and/or other information (e.g., certificates to establish ownership, authority, etc.).

The redirection information may include (i) information usable to direct a configuration device to an interface, and (ii) information usable to direct endpoint device to an onboarding system for onboarding purposes. The information may include addresses, information for resolving the addresses (e.g., may direct to private DNS servers), etc.

At operation 302, a message from a configuration device is obtained. The message may include a GUID of the endpoint device. The message may be obtained by receiving it from the configuration device or another device.

At operation 304, the GUID is identified as identifying the endpoint device. The identification may be made using the ownership voucher. The identification may be made by matching the obtained GUID to a copy of the GUID in the ownership voucher.

At operation 306, the configuration device is redirected to the control plane using the redirection information to complete onboarding of the endpoint device. The configuration device may be redirected to an interface provided by the control plane. The interface may facilitate customization of the onboarding process for the endpoint device. The configuration device may be redirected by providing the information usable to reach the interface, which may include addresses, resolution information, etc.

The method may end following operation 306.

Thus, using the method illustrated in FIG. 3A, a configuration device may be directed to an interface through which onboarding of an endpoint device may be customized. The configuration device may only need access to a tag of the endpoint device to be directed to the interface. When the tag is created, the interface may not yet exist. For example, the tag may be created while the endpoint device is not yet owned by an operator of the control plane. Consequently, the interface may not yet exist. The interface may only be created (or be operable for the endpoint device) after ownership in the endpoint device is transferred to the operator of the control plane.

Turning to FIG. 3B, a flow diagram illustrating a method for performing a customized onboarding of an endpoint device in accordance with an embodiment is shown. The method may be performed by any of deployment 100, endpoint device management system 110, management service 120, and/or other components of the system shown in FIG. 1.

At operation 310, tag information is obtained using a tag of an endpoint device. The endpoint device may need to be onboarded to a deployment. The tag information may be obtained by obtaining an image of the tag, and interpreting the image. The interpretation may provide information usable to operably connect with a rendezvous system and a GUID for the endpoint device. The information usable to operably connect with the rendezvous system may include an address (e.g., internet), resolution for the address, and/or other information. The endpoint device, during onboarding, may be configured to operate in a secure mode and to automatically operably connect to the rendezvous system.

At operation 312, a message is sent to the rendezvous system based on the tag information. The message may include the GUID from the tag information. The message may be sent to the rendezvous system using the information from the tag information usable to operably communicate with the rendezvous system. The message may, for example, indicate that a configuration device is to be used to customize an onboarding process for the endpoint device.

At operation 314, an interface is used to complete onboarding of the endpoint device. The interface may be used by (i) receiving redirection information from the rendezvous system to a control plane (e.g., to the interface managed by the control plane), and (ii) operably connecting to the interface using the redirection information.

The interface may be used by (i) identifying options for customizing the onboarding (e.g., the interface may allow the options to be known to a user of the configuration device), (ii) selecting one or more of the options to define a customized onboarding, and/or (iii) initiating the customized onboarding. When using the interface, a display of the configuration device may display information regarding the operation, and human interface devices of the configuration device may allow a user to provide user input to select any of the operations. Once selected, information based on the selections may be provided to the control plane via the interface. The control plane (or portions thereof) may then implement the onboarding process based on the selections to customize the onboarding for the endpoint device.

The method may end following operation 314.

Using the method illustrated in FIG. 3B, a configuration device in accordance with embodiments disclosed herein may allow onboarding processes to be customized in a manner that would otherwise not be possible using native interfaces implemented by the endpoint device during onboarding.

Turning to FIG. 3C, a flow diagram illustrating a method for performing a customized onboarding of an endpoint device in accordance with an embodiment is shown. The method may be performed by any of deployment 100, endpoint device management system 110, management service 120, and/or other components of the system shown in FIG. 1.

At operation 320, an ownership voucher for an endpoint device is obtained. The endpoint device may be intended to join a deployment, and may have been contractually acquired from another entity. The ownership voucher may be obtained by receiving it from a management service or another entity.

At operation 322, a rendezvous system is configured using the ownership voucher and redirection information. The redirection information may be usable to direct the endpoint device to a control plane that will managing the onboarding, and to direct a configuration device to an interface through which the onboarding of the endpoint device may be managed. The control plane may manage the interface. The rendezvous system may be configured by sending the ownership voucher and redirection information to the rendezvous system.

At operation 324, a first connection with the endpoint device is established. The first connection may be established by (i) receiving a communication from the endpoint device, (ii) using a GUID in the communication and a copy of the GUID in the ownership voucher to identify the endpoint device, and (iii) preparing a channel for communications between the endpoint device and the control plane.

The endpoint device may have been redirected to the control plane by the rendezvous system thereby allowing the endpoint device to communication with an onboarding system and though which onboarding may be completed.

At operation 326, a second connection with a configuration device is established. The second connection may connect the configuration device to an interface managed by the control plane. The second connection may be established by (i) receiving a communication from the configuration device, and (ii) preparing a channel for communications between the configuration device and the interface. The interface may be implemented via any method without departing from embodiments disclosed herein. The configuration device may have been redirected to the interface by the rendezvous system thereby allowing the configuration device to define a custom onboarding process for the endpoint device.

At operation 328, onboarding of the endpoint device is completed using the first connection. The onboarding may be completed by sending data (e.g., instructions, software, configuration settings, etc.) to the endpoint device. The endpoint device may modify its operation using the data thereby placing it into a mode of operation expected by a deployment.

The onboarding may be customized based on instructions received from the configuration device via the second connection. For example, the configuration device may obtain information regarding options for the onboarding using the interface, and the control plane may receive information from the configuration device and via the interface to customize the onboarding process.

The method may end following operation 328.

Figure 4:
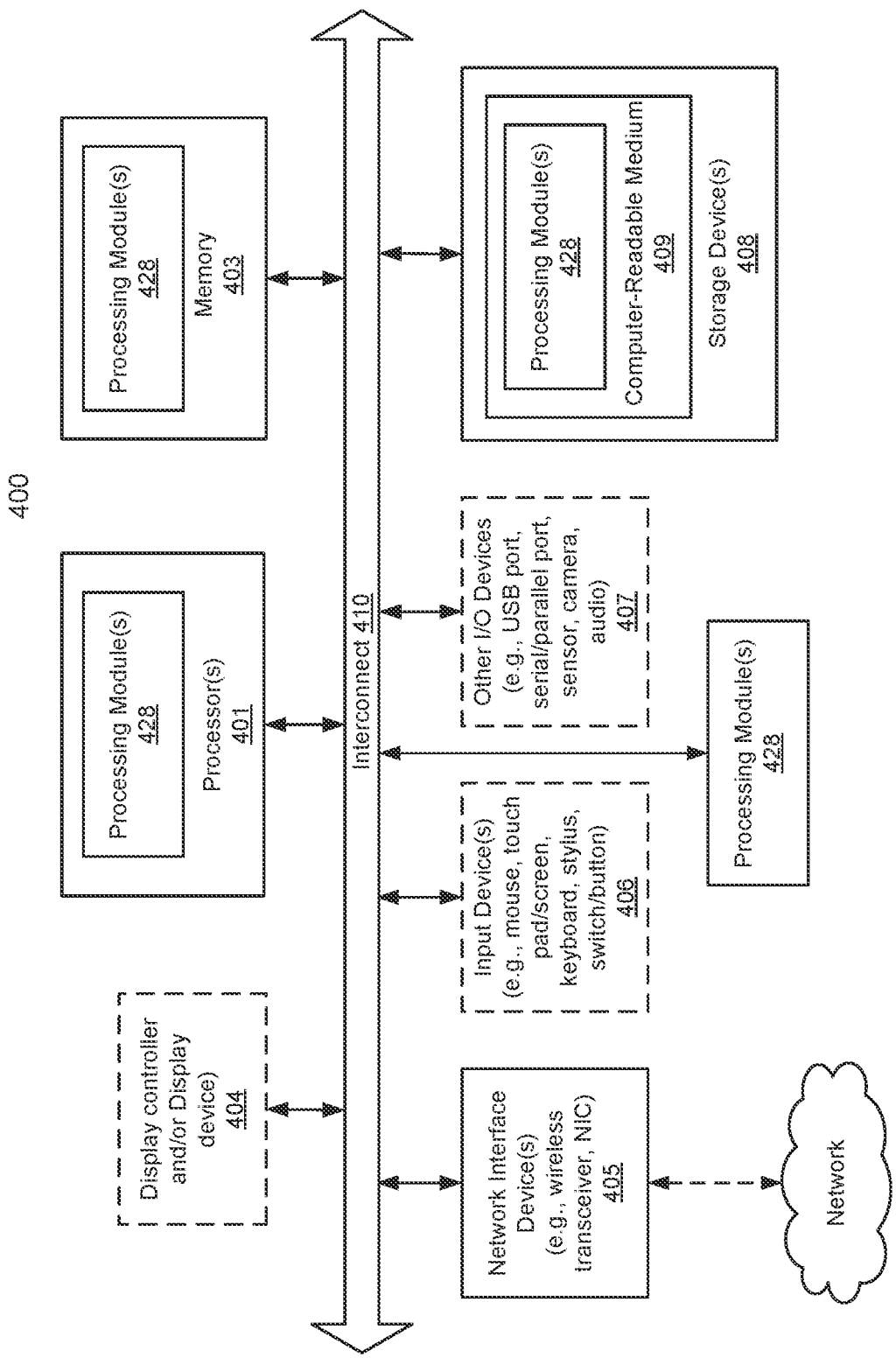
FIG. 4 shows a block diagram illustrating a data processing system in accordance with an embodiment.

Any of the components illustrated in FIGS. 1-2E may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing an onboarding of a data processing system, the method comprising:
   by a configuration device that is configured to onboard the data processing system:
      obtaining tag information from a physical tag affixed to a physical surface of the data processing system, the tag information comprising a link and a globally unique identifier for the data processing system;
      sending a message to a rendezvous system using the link to initiate the onboarding of the data processing system via a control plane, the message comprising the globally unique identifier from the tag;
      using, based on redirection of the configuration device to the control plane by the rendezvous system in response to the rendezvous system receiving the message from the configuration device, a graphical user interface generated and provided by the control plane to complete the onboarding of the data processing system, the control plane being implemented using a computing device that is separate and distinct from all of the data processing system, the configuration device, and the rendezvous system, and the graphical user interface being provided by the control plane to the configuration device; and
      completing the onboarding of the data processing system using the graphical user interface and the control plane.

2. The method of claim 1, wherein obtaining the tag information comprises:
   obtaining an image depicting the tag, the tag being a barcode; and
   decoding the image of the tag to obtain the link and the globally unique identifier.

3. The method of claim 2, wherein the tag information is obtained while the data processing system is operating in a secure mode that prevents at least one onboarding operation from being initiated using the data processing system, the onboarding operation being able to be initiated using the graphical user interface.

4. The method of claim 3, wherein the redirection to the rendezvous system is responsive to the message and tied to the globally unique identifier.

5. The method of claim 4, further comprising:
   before the configuration device obtains the tag information and initiates the onboarding, and by the computing device that is used to implement the control plane:
      obtaining an ownership voucher for the data processing system, the ownership voucher comprising digital certificates that are used to verify ownership information of the data processing system; and
      providing the rendezvous system with the ownership voucher and redirection information for the control plane.

6. The method of claim 1, wherein the method further comprises:
   during the onboarding, and by the computing device that is used to implement the control plane:
      establishing a first direct connection with the data processing system;
      establishing a second direct connection with the configuration device, the second direct connection being separate from the first direct connection;
      providing the graphical user interface to the configuration device using the second direct connection;
      obtaining onboarding instructions from the configuration device via the graphical user interface; and
      participating in the completion of the onboarding of the data processing system based on the onboarding instructions by modifying operations of the data processing system based on the onboarding instructions obtained from the configuration device.

7. The method of claim 6, wherein the configuration device is a personal computing device comprising a camera that is used to obtain an image, the personal computing device being a separate and distinct device from the data processing system and being selected from a group consisting of: a smart phone, a tablet computer, and a laptop.

8. The method of claim 1, wherein the data processing system is already in connection with the control plane via a first direct channel established directly between the data processing system and the control plane before the configuration device sends the message to the rendezvous system.

9. The method of claim 8, wherein redirection of the configuration device to the control plane by the rendezvous system causes the configuration device to establish a second channel directly between the configuration device and the control plane, the second channel being separate from the first direct channel.

10. The method of claim 8, wherein the first channel between the data processing system and the control plane is established independent of the configuration device.

11. The method of claim 1, wherein the control plane further provides, through the graphical user interface, onboarding options for the onboarding of the data processing system to the configuration device.

12. A non-transitory machine-readable medium having instructions stored therein, which when executed by at least one processor, causes a configuration device that is configured to onboard a data processing system to perform operations for managing an onboarding of the data processing system, the operations comprising:
   obtaining tag information from a physical tag affixed to a physical surface of the data processing system, the tag information comprising a link and a globally unique identifier for the data processing system;
   sending a message to a rendezvous system using the link to initiate the onboarding of the data processing system via a control plane, the message comprising the globally unique identifier from the tag;
   using, based on redirection of the configuration device to the control plane by the rendezvous system in response to the rendezvous system receiving the message from the configuration device, a graphical user interface generated and provided by the control plane to complete the onboarding of the data processing system, the control plane being implemented using a computing device that is separate and distinct from all of the data processing system, the configuration device, and the rendezvous system, and the graphical user interface being provided by the control plane to the configuration device; and completing the onboarding of the data processing system using the graphical user interface and the control plane.

13. The non-transitory machine-readable medium of claim 12, wherein obtaining the tag information comprises:
obtaining an image depicting the tag; and
decoding the image of the tag to obtain the link and the globally unique identifier.

14. The non-transitory machine-readable medium of claim 13, wherein the tag information is obtained while the data processing system is operating in a secure mode that prevents at least one onboarding operation from being initiated using the data processing system, the onboarding operation being able to be initiated using the graphical user interface.

15. The non-transitory machine-readable medium of claim 14, wherein the redirection to the rendezvous system is responsive to the message and tied to the globally unique identifier.

16. The non-transitory machine-readable medium of claim 12, wherein the configuration device is a personal computing device comprising a camera that is used to obtain an image, the personal computing device being a separate and distinct device from the data processing system and being selected from a group consisting of: a smart phone, a tablet computer, and a laptop.

17. A configuration device, comprising:
at least one processor; and
a memory coupled to the processor to store instructions, which when executed by the processor, cause the configuration device that is configured to onboard a data processing system to perform operations for managing an onboarding of the data processing system, the operation comprising:

obtaining tag information from a physical tag affixed to a physical surface of the data processing system, the tag information comprising a link and a globally unique identifier for the data processing system;

sending a message to a rendezvous system using the link to initiate the onboarding of the data processing system via a control plane, the message comprising the globally unique identifier from the tag;

using, based on redirection of the configuration device to the control plane by the rendezvous system in response to the rendezvous system receiving the message from the configuration device, a graphical user interface generated and provided by the control plane to complete the onboarding of the data processing system, the control plane being implemented using a computing device that is separate and distinct from all of the data processing system, the configuration device, and the rendezvous system, and the graphical user interface being provided by the control plane to the configuration device; and completing the onboarding of the data processing system using the graphical user interface and the control plane.

18. The configuration device of claim 17, wherein obtaining the tag information comprises:
obtaining an image depicting the tag; and
decoding the image of the tag to obtain the link and the globally unique identifier.

19. The configuration device of claim 18, wherein the tag information is obtained while the data processing system is operating in a secure mode that prevents at least one onboarding operation from being initiated using the data processing system, the onboarding operation being able to be initiated using the graphical user interface.

20. The configuration device of claim 19, wherein the redirection to the rendezvous system is responsive to the message and tied to the globally unique identifier.

* * * * *